United States Patent
Davis

(10) Patent No.: US 7,443,841 B2
(45) Date of Patent: Oct. 28, 2008

(54) LONGEST PREFIX MATCHING (LPM) USING A FIXED COMPARISON HASH TABLE

(75) Inventor: Andrew Davis, Santa Cruz, CA (US)

(73) Assignee: Nortel Networks Limited, St. Laurent, Quebec (CA)

(*) Notice: Subject to any disclaimer, the term of this patent is extended or adjusted under 35 U.S.C. 154(b) by 1499 days.

(21) Appl. No.: 10/283,717

(22) Filed: Oct. 30, 2002

(65) Prior Publication Data

US 2004/0085953 A1    May 6, 2004

(51) Int. Cl.
  *H04L 12/66* (2006.01)
(52) U.S. Cl. ...................... 370/356; 370/352
(58) Field of Classification Search ......... 370/352–356, 370/395.52
  See application file for complete search history.

(56) References Cited

U.S. PATENT DOCUMENTS

| | | | | |
|---|---|---|---|---|
| 5,574,781 A | * | 11/1996 | Blaze | 379/207.15 |
| 6,535,869 B1 | * | 3/2003 | Housel, III | 707/2 |
| 6,788,775 B1 | * | 9/2004 | Simpson | 379/207.13 |

* cited by examiner

*Primary Examiner*—Suhan Ni
(74) *Attorney, Agent, or Firm*—Guerin & Rodriguez, LLP; Michael A. Rodriguez

(57) ABSTRACT

Described are an apparatus and method of forwarding Internet Protocol (IP) packets. At least one fixed-length key having a predetermined number of bits is produced in response to an IP address in an IP packet. At least a portion of the fixed-length key is hashed to obtain a hash value. The fixed-length key is compared with a key value stored in each data-item in a hash bucket associated with the hash value to find the data item that has the key value that matches the fixed-sized key and to obtain from that data item routing information that is used to forward the IP packet.

20 Claims, 6 Drawing Sheets

LONGEST PREFIX MATCHING (LPM) USING A FIXED COMPARISON HASH TABLE

FIELD OF THE INVENTION

The invention relates generally to computer networks. More particularly, the invention relates to a system and method of forwarding packets in a computer network.

BACKGROUND

Internet Protocol (IP) address lookup is a bottleneck in the performance of routers and switches operating on the Internet. Expectations are for the bottleneck to worsen with increasingly larger routing tables, faster communication links, heavier packet traffic, and the migration from 32-bit Internet Protocol Version 4 (IPv4) addresses to 128-bit Internet Protocol Version 6 (IPv6) addresses. Consequently, it is becoming increasingly important for routers and switches to employ IP packet forwarding that can meet these increasing demands.

FIG. 1 illustrates a network including a router 20. The router 20 receives IP packets 22 from a node (NODE A) in the network. Each received IP packet 22 has a header 24 and data 28. The header 24 includes a destination address field 26, which has an IP address of a node (or host) to which the IP packet 22 is targeted. With this IP address, the router 20 accesses a forwarding table 32 to determine to which node to forward the IP packet 20. In general, the selected node is that which advances the IP packet 22 towards its destination.

A technique for implementing a forwarding table is to use a longest prefix matching (LPM) algorithm. A basic principle of IP addressing is that routers and switches can use the prefixes of an IP address to make routing decisions. A familiar dot-notation for a 32-bit IP address includes four decimal values separated by periods (e.g., 208.128.16.10). Each decimal value is represented by 8 bits (a byte). The leftmost 16 bits of the IP address can, for example, identify a corporation, the leftmost 20 bits of the IP address an office in that corporation, the leftmost 24 bits a particular network (e.g., Ethernet) in that office, and all 32 bits a particular host device on that network.

When performing the LPM algorithm, the router 20 compares the destination address 26 to entries in the forwarding table 32 to find the entry with the longest matching prefix. That entry indicates the location (or node) towards which to send the IP packet 22. For example, consider that the router 20 receives an IP packet 22 with a destination address of 208.128.16.10 and upon searching the forwarding table 32 finds two entries with matching prefixes, the first entry being 208.128 and the second entry being 208.128.16. The router 20 then selects the second entry (208.128.16) because it is longer than the first entry.

One way to implement the LPM algorithm is to use a prefix tree (i.e., a binary tree) having a root node, intermediate nodes, and leaf nodes. The leaf nodes represent prefix entries in the forwarding table 32. The prefix tree is built only to the extent needed to represent all of the entries in the forwarding table 32. The router 20 searches for the longest prefix in the prefix tree that matches part of or the entire destination IP address 26 by traversing the prefix tree from root node to a leaf node, possibly passing through one or more intermediate nodes. Each node traversed adds a bit to the matching prefix. From a leaf node the router 20 obtains the forwarding location. A disadvantage of using a direct implementation of the prefix tree is that the process can require a traversal of as many nodes as there are bits in the IP address to obtain the forwarding location. Thus there is a need for improving implementations that use the longest prefix matching algorithm for forwarding IP packets.

SUMMARY

In one aspect the invention features a method of forwarding Internet Protocol (IP) packets. At least one fixed-length key having a predetermined number of bits is produced in response to an IP address in an IP packet. At least a portion of the fixed-length key is hashed to obtain a hash value. The fixed-length key is compared with a key value stored in each data item in a hash bucket associated with the hash value in order to find the data item that has the key value that matches the fixed-sized key and to obtain from that data item routing information that is used to forward the IP packet.

In another aspect the invention features an apparatus for forwarding IP packets: A key generator produces a fixed-length key having a predetermined number of bits in response to an IP address. A hash value generator hashes a portion of the key to produce a hash value. A comparator compares the fixed-length key with a key value stored in each data item in a hash bucket associated with the hash value in order to find the data item that has the key value that matches the fixed-sized key and to obtain from that data item routing information that is used to forward the IP packet.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention features a length table, a hash table, and fixed-length keys to improve implementations of the longest prefix matching algorithm used by network devices, such as routers and switches, to forward IP (Internet Protocol) packets through a network such as the Internet. In brief overview, a network device practicing the invention produces a plurality of fixed-length keys based on a prefix tree and stores these keys, with corresponding routing information, in a hash table. When an IP packet later arrives at the network device, the network device uses some or all of the destination IP address bits to produce one or more keys that are used to search the hash table for a matching key. If there is more than one key, the network device uses first the key that is constructed from the most destination IP address bits, and ceases from searching the hash table upon finding a match, thus the network device is using the longest prefix matching. Finding the matching key results in the retrieval of routing information.

Figure 1:
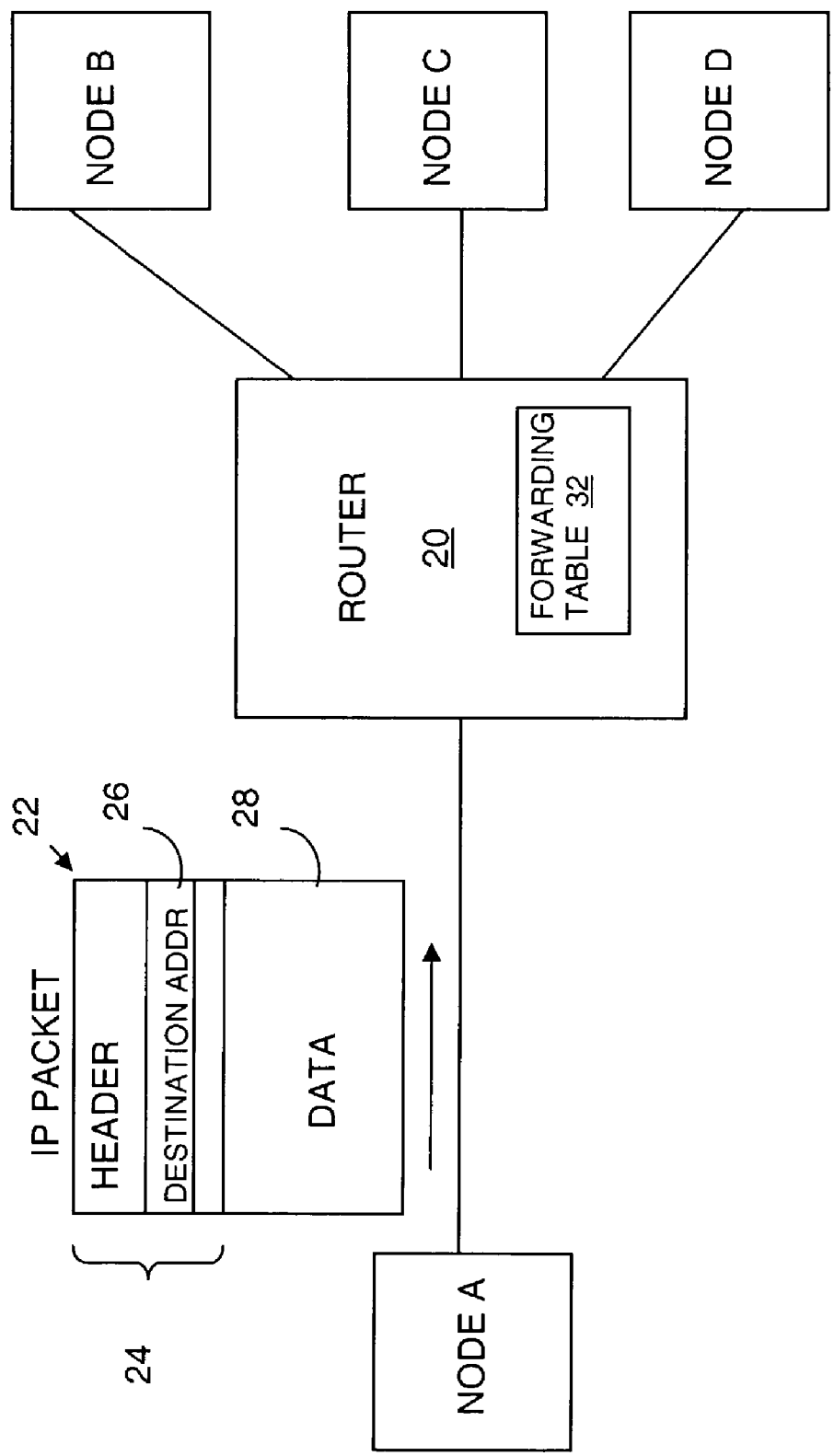
FIG. 1 is a diagram of a network including a router that forwards IP packets over the network according to a longest prefix matching algorithm.
Figure 2:
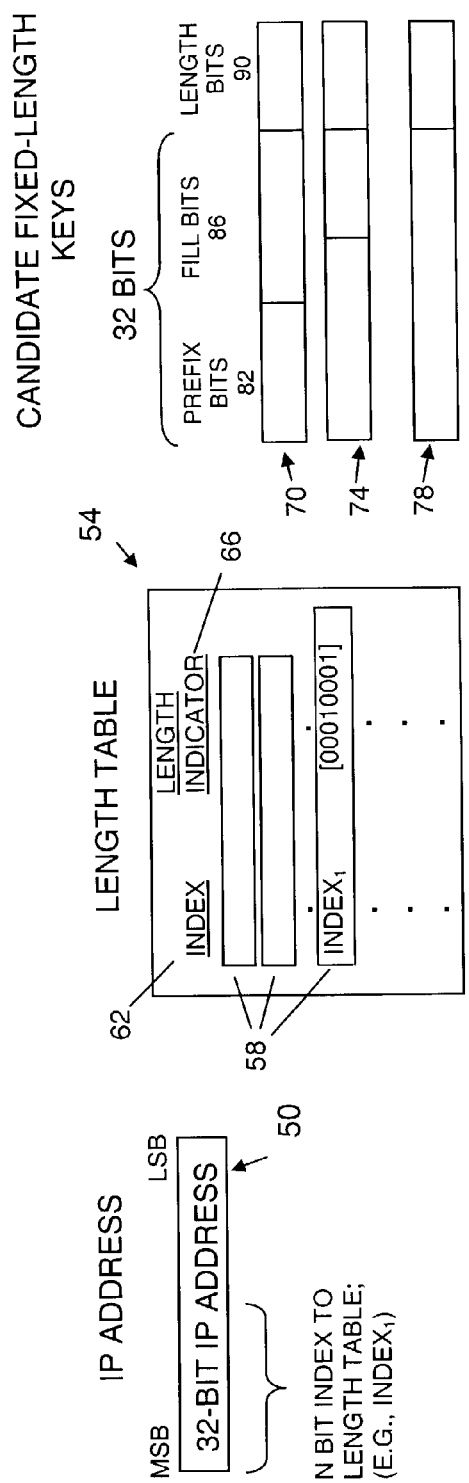
FIG. 2 is a diagram of an embodiment of an IP address, of a length table of candidate fixed-length keys, and of a hash table constructed in accordance with the present invention.
Figure 2:
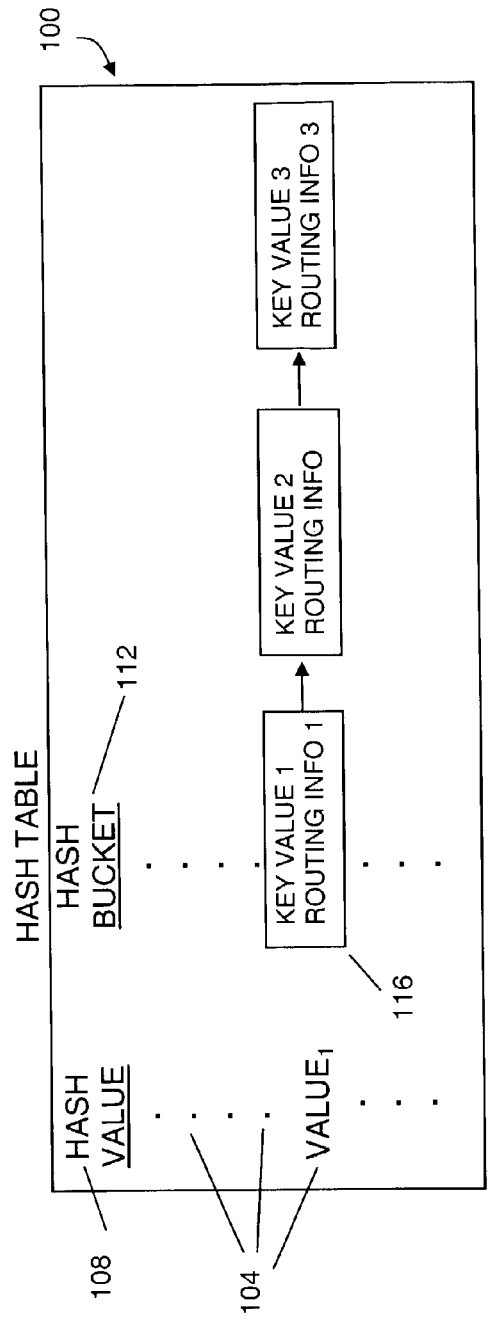

More specifically, FIG. 2 shows a general format for a destination IP address 50 (e.g., 32 bits), a length table 54, fixed-length keys 70, 74, and 78, and a hash table 100 constructed in accordance with the principles of the invention. When an IP packet arrives at a network device, a predetermined number ("N") of the most significant bits of the IP address 50 are used as an index into the length table 54. The network device uses the length table 54 to determine the number of keys and the number of bits of the IP address 50 used to construct those keys, which are later used to find routing information. In one embodiment, the size of the index is 20 bits in length. The principles of the invention also apply to other versions of IP addresses (e.g., IPv6, which are 128 bits in length) and to other indices of longer or shorter lengths.

The length table 54 has a plurality of entries 58, each entry 58 including an index field 62 and a length indicator field 66. The index field 62 stores a value (e.g. $INDEX_1$) that is used to retrieve the length indicator value of that particular entry 58. The value of the length indicator indicates one or more prefix lengths for IP addresses that have the N bits that match the index. In one embodiment, each bit that is set (i.e., equal to "1") in the length indicator value represents a prefix length to be used to construct a key. For example, the value in the length indicator field 66 that is retrieved using the index $INDEX_1$ is "00010010b." The set bits represent prefix lengths of 1 bit and 4 bits (counting from the right to left and starting from 0). In general, values stored in the length indicator field 66 can represent prefix lengths up to as many bits as there are in the IP address (e.g., 32 for an IPv4 address, 128 for an IPv6 address).

In another embodiment, each entry has a plurality of length indicator fields, each such field storing a value that represents one prefix length.

As described above, each fixed-length key constructed in accordance with the invention has one of the general formats 70, 74, 78. Each key 70, 74, 78 includes a variable-length prefix-bit field 82 and a fixed-length length-bit field 86. The length of the prefix field 82 can range from 1 bit to a predetermined maximum number of bits. The keys have a "fixed length" in that each key has the same predetermined number of bits.

To ensure that each key has this same number of bits, some keys (i.e., those that do not fully use the maximum number of prefix bits) have a fill-bit field 90. The variable length of the prefix field 82 and the variable length of the fill-bit field 90 combine to achieve predetermined length (e.g., 32 bits). Key formats 70 and 74 illustrate keys that have prefix fields 82 with less than the maximum number of bits. Each format uses fill bits to reach the maximum number, key format 70 using more fill bits than key format 74. Key format 78 illustrates those keys that have the maximum number of prefix bits, and thus have no fill bits.

Keys are constructed: 1) when constructing the hash table 100; and 2) when routing information for an arriving IP packet needs to be retrieved from the hash table 100. When constructing the hash table 100, keys are constructed from each prefix in a prefix tree. For each prefix, if the number of prefix bits for that prefix is less than the maximum number (described above), a number of fill bits are inserted to reach the maximum number. These fill bits can have any predetermined value. In one embodiment, each fill bit has a binary value of 1. Other predetermined patterns are usable, provided the same pattern is used to construct each candidate key. The combination of prefix bits and fill bits, if any, is referred to as the IP address portion of the key. Appended to the IP address portion of the key are the length bits which indicate the number of prefix bits in the key. The keys are stored in the hash table 100, as described below.

When seeking to obtain routing information for an arriving IP packet from the hash table 100, a candidate key is constructed for each prefix length obtained from the length table 54. The uppermost (i.e., most significant) N bits of the IP address 50 operate as an index that identifies an entry 58 of the length table 54. The entry 58 lists one or more prefix lengths. A candidate fixed-length key is constructed for each prefix length, each prefix length obtained from the length table 54 determining the number of prefix bits to use from the destination IP address (from MSB to LSB). The value of the length bits and number of fill bits are as described above for when constructing keys for the hash table 100. These fixed-length keys are referred to candidate keys because such keys do not necessarily result in the retrieval of routing information from the hash table 100, for instance, when the length table 54 indicates that there are multiple prefix lengths, only one of the keys constructed from those prefix lengths operates to retrieve routing information.

Having a fixed-length key is advantageous because it leads to a uniform implementation of a hash table 100 and of hardware and software. Additionally, the use of the fill bits provides that for a given set of prefix bits of the IP address and corresponding length bits, that there is only one candidate fixed-length key.

The hash table 100 includes a plurality of entries 104, each having a hash value 108 and a hash bucket 112. Each hash bucket 112 is a linked list (e.g., singly or doubly linked) of data items. Each data item includes a key value and associated routing information. Each fixed-length key is hashed to produce an index to the hash table 100. In general, any hashing algorithm can be used, preferably one that can equally distribute items within the hash buckets 112 of the hash table 100. In one embodiment, the hash algorithm produces hash values by exclusive-ORing the odd and even bits of the key.

When an IP packet with a destination IP address 50 arrives at the network device, the network device obtains a prefix length or lengths from the length table 54 based on the destination IP address 50 and constructs a candidate fixed-length key or keys (as described above) for each prefix length. Using first the candidate key with the most prefix bits (e.g., as indicated by the length bits), the network device produces a hash value 108 for that candidate key, uses the hash value 108 as an index into the hash table to select a hash bucket 112 to search, and compares the candidate key with the key value in each of the data items 116 in that hash bucket. If the candidate key matches one of the key values of a data item in the hash bucket, the routing information associated with the matching key value is used for forwarding the IP packet. The searching process does not need to continue with the other candidate keys, if any, because of the match.

If the candidate key does not match the key value of any data item 116 in that hash bucket, the network device selects the next candidate key (with the next highest number of prefix bits). If no key values are ultimately found to match any of the candidate keys, the network device can use a default route.

Figure 3A:
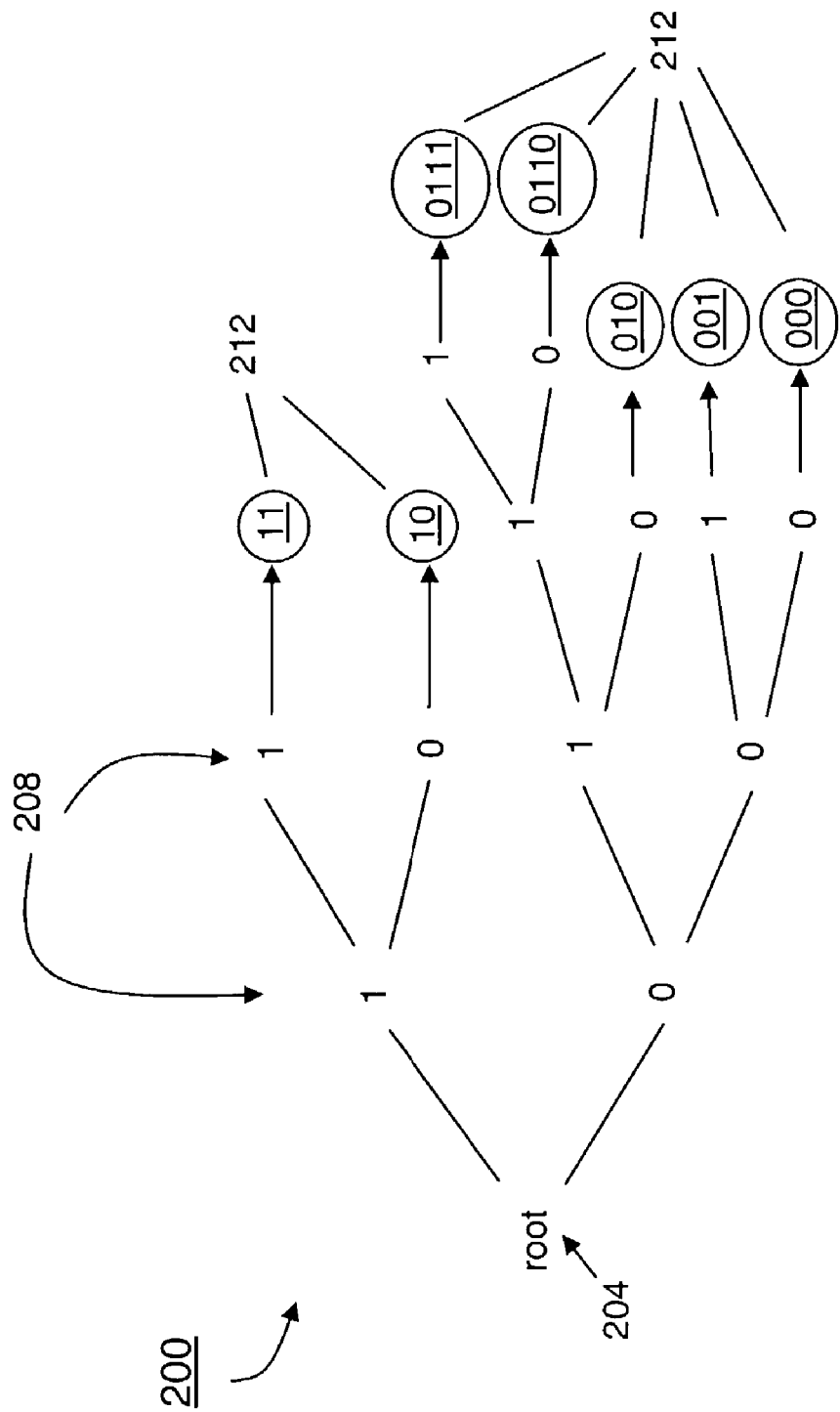
FIG. 3A is a diagram of an exemplary simplified embodiment of a prefix tree.
Figure 3B:
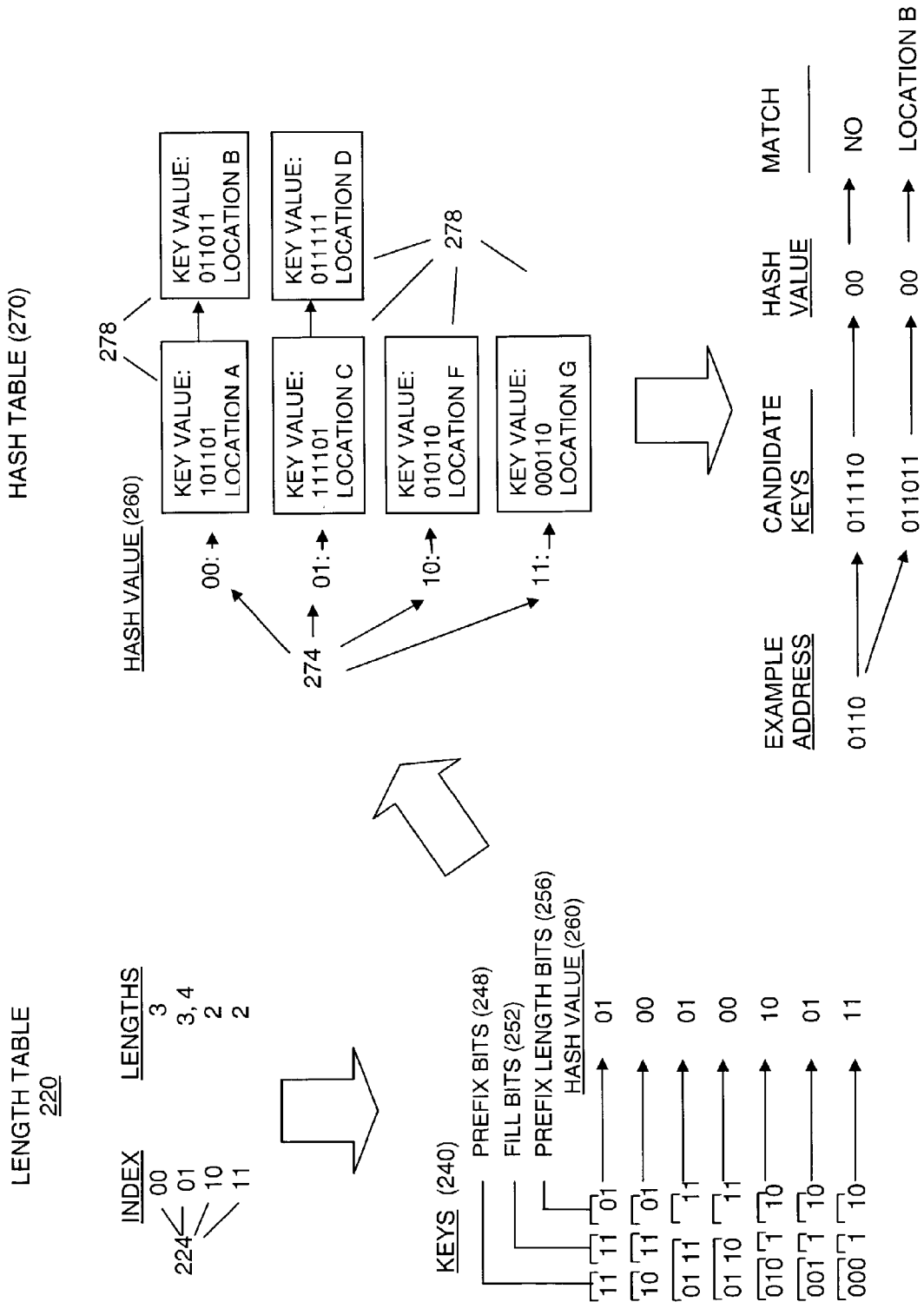
FIG. 3B is a diagram illustrating a matching of an example IP address with a forwarding location using a simplified embodiment of a length table constructed from the prefix tree of FIG. 3A, candidate fixed-length keys and corresponding hash values based on the prefix tree of FIG. 3A, and a hash table based on the candidate fixed-length keys and hash values.

FIG. 3A and FIG. 3B provide an example to illustrate the present invention. FIG. 3A shows a simplified example of a prefix tree 200 constructed for four-bit IP addresses having a root node 204, a plurality of intermediate nodes 208 (not circled), and leaf nodes 212 (circled and underlined). Each leaf node 212 represents a prefix. Each intermediate node 208 of the prefix tree contributes a bit to a prefix used to produce fixed-length keys for the hash table 270 (FIG. 3B). In this example, some prefixes are two bits in length, others three bits, and others four bits. The prefix tree 200 is built only to the extent needed to represent all of the prefixes available or known to the network device. Prefixes can be added or removed from the prefix tree as the network topology to which the network device is connected changes.

The prefix tree 200 of FIG. 3A provides the information used to construct the length table 220 shown in FIG. 3B. For this example, consider that the index to the length table 220 is 2 bits in length, giving four entries 224 to the length table 220. From FIG. 3A it can be seen that the index "01," for example, has three possible prefixes: "0111," "0110," and "010." These prefixes have lengths of 4 bits, 4 bits, and 3 bits, respectively. The entry 224 for index "01" thus has length indicators of 3 bits and 4 bits. As another example, the index "10" has one possible prefix: "10", which has a length of 2 bits.

FIG. 3B also shows a list 240 of the candidate keys 244 derived from the length table 220. Each key 244 includes prefix bits 248, fill bits (here "1"s) 252, if any, and a predetermined number of length bits 256. There is one key 244 for each prefix (leaf node) in the prefix tree 200 of FIG. 3A. For the prefix "11," for example, the key 244 has two prefix bits "11," two fill bits "11," and length bits "01" (indicating 2 bits). Note that in some cases the key 244 does not have fill bits because the prefix is four bits in length. Prefix "0111" in the prefix tree 200 of FIG. 3A is such an example. The key 244 for prefix "0111" has four prefix bits "1111," zero fill bits, and length bits "11" (indicating 4 bits).

From each of the keys 244, a hash value 260 is produced. The hash value algorithm used in this example is an exclusive-OR of the odd and even bits of the key 244. This example produces four different hash values 260. Each hash value 260 represents a hash bucket 274 of a hash table 270. The hash buckets 274 are implemented as a linked list memory structure. Each hash bucket 274 has one or more data items 278. Each data item 278 includes a key value and routing information associated with that key value. Each key value corresponds to one of the keys 240 produced from the prefix tree 200 (FIG. 3A).

FIG. 3B also shows an example, in tabular form, of process for obtaining routing information for forwarding an IP packet having an exemplary destination IP address of "0110" using the length table 220 and hash table 270. Using the first two bits of the IP address (i.e., "01") as an index to the length table 220, the identified entry 224 indicates that the possible prefix lengths are 3 and 4. This means that two candidate keys can be constructed. The first candidate key has 3 prefix bits, "011," one fill bit "1," and length bits ("10") that indicate that the prefix bit length is 3. The second candidate key has 4 prefix bits, which in this example is the full destination IP address, and so no fills bits are used. Length bits ("11") indicate that the prefix bit length is 4 bits.

Using the hash algorithm described above, the first and second candidate keys hash to a hash value 00. Accordingly, each candidate key is compared against the key values of each data item 278 in the hash bucket 274 identified by the hash value 260. For the first candidate key, "011110," no data item 278 has a key value that matches. For the second candidate key, "011011," a match is found. In this instance, the matching data item 278 has data indicating that the routing information identifies "location B." Thus, for this example, network device forwards the IP packet associated with the example destination IP address to location B (e.g., an output port, a network node). In one embodiment, the network device searches for a match for the second candidate key before the first candidate key because the second candidate key has a greater number of prefix bits. Consequently, after detecting a match, the network device does not need to continue because the longest prefix has been matched and thus does not waste processor instruction cycles searching for a match for keys with fewer prefix bits, such as the first candidate key. Also, in accordance with the present invention, at most one match exists for each candidate key, an advantage being that the comparisons in a hash bucket can cease when the match is found.

In the simplified example of FIG. 3A and FIG. 3B, the IP address is 4 bits in length. An advantage of the present invention over prefix-tree searching becomes more apparent for IP addresses with a greater number of bits (e.g., 32 bits). The use of the hash table 270 with a large number of hash buckets 274 (e.g., 64 K) over which the data items 278 are distributed, has fewer comparisons (between the candidate key and data item key values) than searching along a prefix tree. The fewer comparisons effectively quicken forward matching algorithms.

Figure 4:
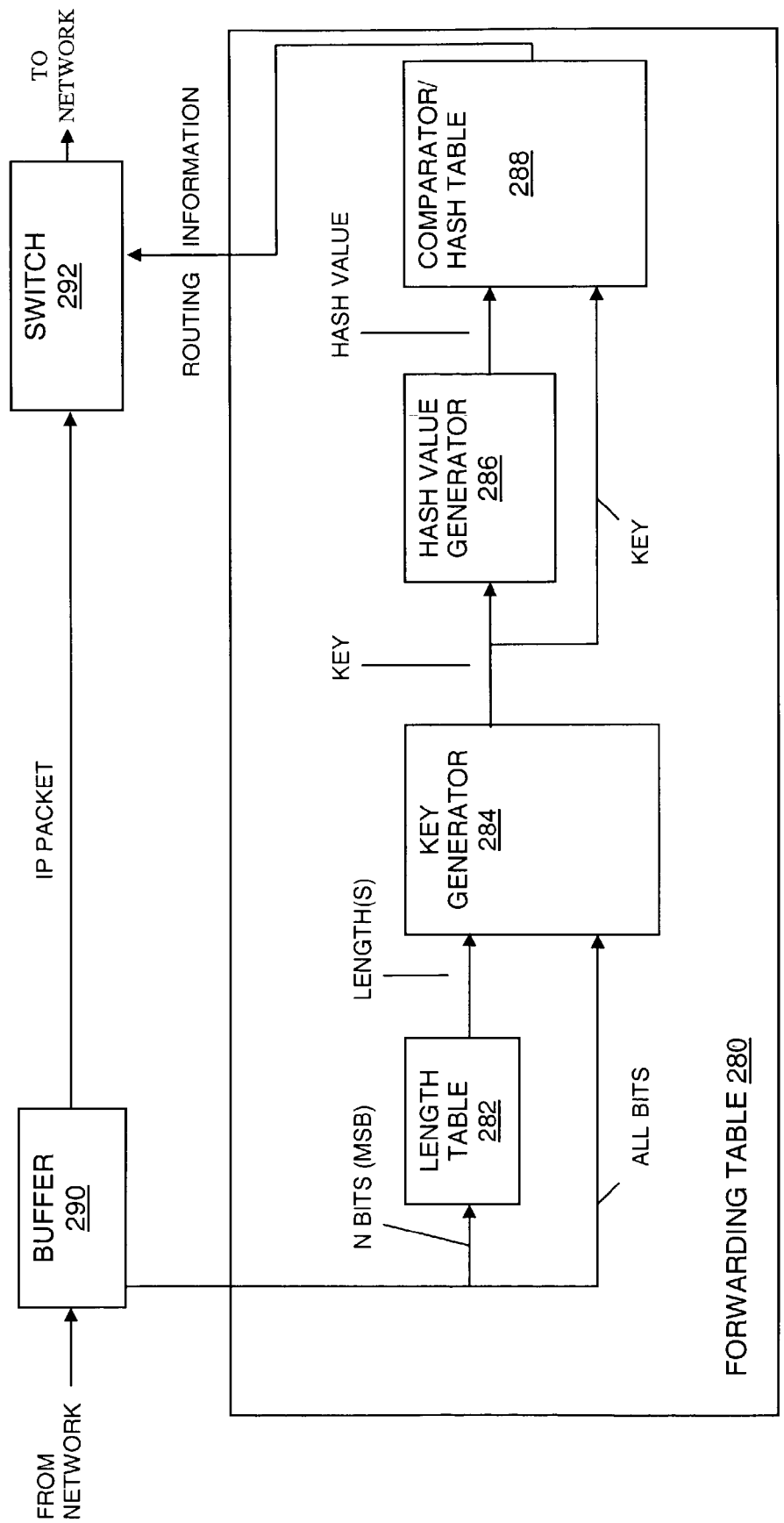
FIG. 4 is a flowchart of an embodiment of a process for constructing and using forwarding table of the present invention.

FIG. 4 shows an embodiment of a forwarding table 280 of the present invention that can be used by a network device (e.g., a router) to forward IP packets toward their destinations. The forwarding table 280 can be implemented in hardware, software, or a combination of hardware and software. The forwarding table 280 includes a length table 282, a key generator 284, a hash value generator 286, and a hash table 288. The forwarding table 280 is in communication with a buffer 290 for receiving a destination IP address taken from an IP packet that has arrived at the network device. A switch 292 is in communication with the buffer 290 to receive the IP packet and with the forwarding table 280 to receive routing information. The routing information indicates to the switch 292 a direction in which to forward the IP packet over the network.

The length table 282 includes the lengths of potentially matching IP address prefixes and is indexed by the first (i.e., most significant) N bits of the destination IP address. Preferably, the number of entries in the length table 282 is a power of two. For example, the uppermost byte of the IP address (i.e., N=8) can operate as an index to a length table 282 with 256 entries. Each index maps to a length table entry and each bit that is set in the length indicator field of that length table entry corresponds to a potentially matching IP address prefix having that many matching most significant bits.

An address with fewer bits than one byte can map to multiple entries of the 256-entry table (provided the length table 282 has multiple entries with bits that match the corresponding bits of the IP address). Table 1 below provides an example of the 256-entry length table 282 described above.

TABLE 1

| INDEX VALUE (ENTRY NO.) | LENGTH INDICATOR | OPERATION |
| --- | --- | --- |
| 0 | 0x00010000 (HEX) | When the first byte of the IP address is 0000 0000, then the prefix length is 16 bits (the "1" in the length indicator is in the 17th bit position, indicating a length of 16 bits). |

TABLE 1-continued

| INDEX VALUE (ENTRY NO.) | LENGTH INDICATOR | OPERATION |
|---|---|---|
| 1 | 0x00100000 (HEX) | When the first byte of the IP address is 0000 0001, then the prefix length is 20 bits (the "1" in the length indicator is in the 21st bit position, indicating a length of 20 bits). |
| 2 | 0x00000080 (HEX) | When the first byte of the IP address is 0000 0010, then the prefix length is 7 bits. |
| 3 | 0x00000080 (HEX) | When the first byte of the IP address is 0000 0011, then the prefix length is 7 bits. |
| 254 | 0x01000000 (HEX) | When the first byte of the IP address is 1111 1110, then the prefix length is 24 bits. |
| 255 | 0x00010000 (HEX) | When the first byte of the IP address is 1111 1111, then the prefix length is 16 bits. |

As shown in TABLE 1, multiple entries of this embodiment of the length table 282 indicate a 7 bit prefix length. If, for example, the route for any IP address prefix of length 7 is equal to "0000 001," which is shorter than the predetermined index length of one byte, these bits match index entry no. 2 and index entry no. 3 (and map to the same hash table entry). Accordingly when the route length is less than the $\log_2$ of the number of length table entries, a a length is inserted for each length table index that matches (i.e., here matching indices have the most significant bits, where M is the number of bits in the route length).

Figure 5:
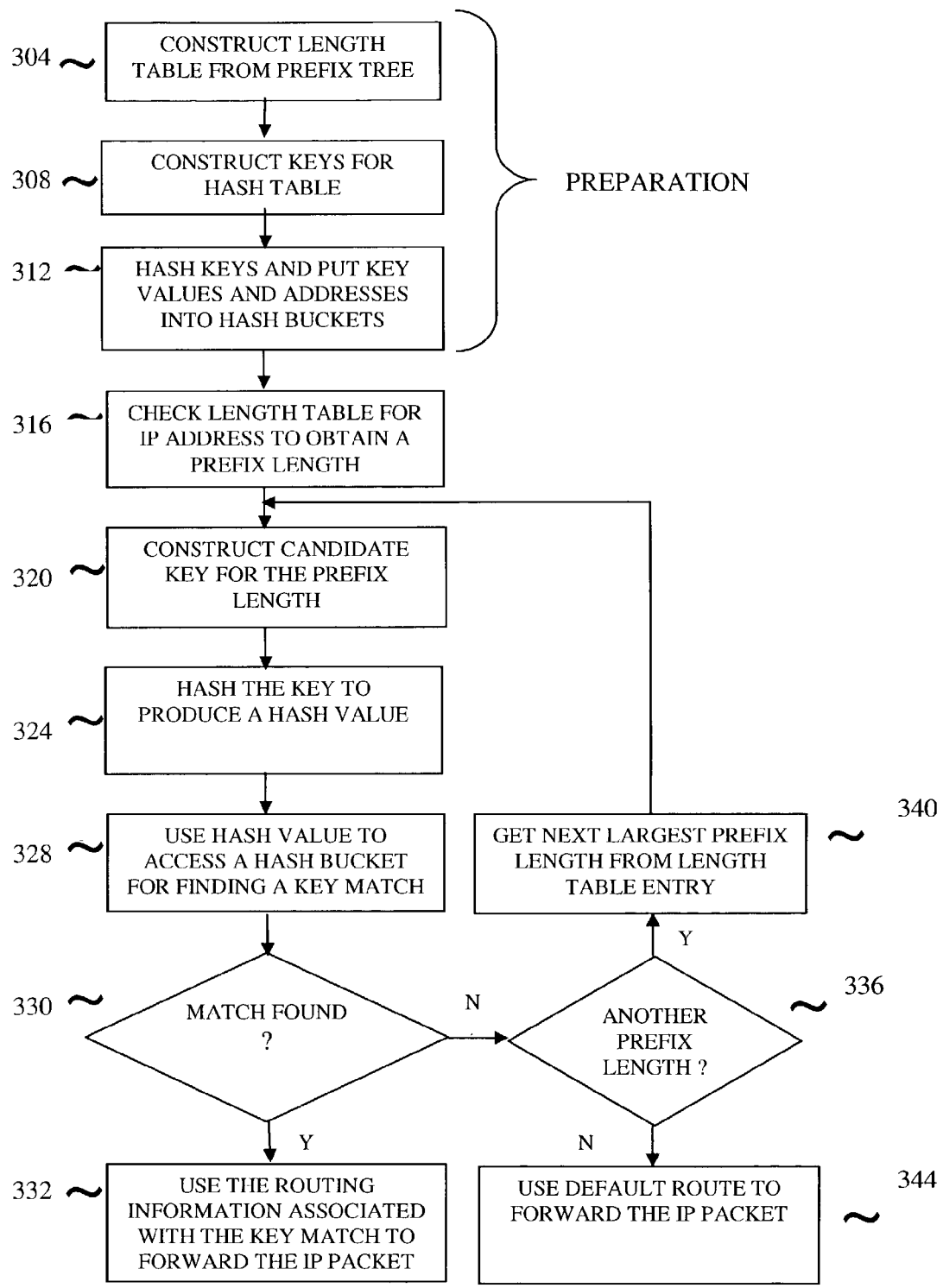
FIG. 5 is a diagram illustrating an embodiment of a system for forwarding an IP packet in accordance with the principles of the invention.

FIG. 5 shows an embodiment of a process 300 of constructing the hash table 288 of FIG. 4 and of obtaining the routing information for a destination IP address in accordance with the principles of the invention. Referring also to FIG. 4, the length table 282 (step 304) is constructed based on a prefix tree and a predetermined index size. For each possible index having the predetermined index size, one or more prefix lengths are determined from the prefix tree. The length table 282 includes each prefix length determined for that index.

In step 308, the key generator 284 constructs a key value for each prefix in the prefix tree. The keys are constructed using the prefix bits, fill bits, if any, and prefix length bits. The hash value generator 286 hashes (step 312) each key to produce a hash value for that key. Each key is then stored in the hash table 288. More specifically, the hash value for each key identifies a hash bucket in the hash table 288 in which that key is stored as a key value. Also stored in the data item with the key value is associated routing information. Performance of steps 304, 308, and 312 to construct the length table 282 and hash table 288 can occur as a background operation, and in some embodiments, periodically (e.g., every five minutes) to update the tables 282 and 288.

Pseudo-code for adding entries to the length and hash tables 282, 288 is as follows: Given "IP_Addr"=the IP address, '>>' is a logical right shift, and PLT[ ] represents the length table 282 having PLT_SIZE entries:

```
Key.IP_addr = IP_Addr | (0xffffffff >> prefix_length) !
Key.prefix = prefix_length
// add entry to hash table
Add_Table_Entry(key, Data)
// add entry to length table
```

```
if (prefix_length >= lg2(PLT_SIZE))
    PLT[IP_Addr >>(32-lg2(PLT_SIZE))] |= prefix_length
else
    for (i=0; i < 2^(lg2(PLT_SIZE)-prefix_length); i++)
        PLT[(IP_Addr >> prefix_length) +i] |= prefix_length
```

Pseudo-code for deleting entries from the length and hash tables 282, 288 is as follows:
Given "IP_Addr"=the IP address, '>>' is a logical right shift, and PLT[ ] represents the length table 282 having PLT_SIZE entries:
// delete entry from hash table
Key.IP_addr=IP_Addr|( )xffffffff>>prefix_length)
Key.prefix=prefix_length
Del_Table_Entry(Key)

Removing prefix lengths from the length table 282 is less straightforward than removing entries from the hash table 288. Each length bit in the length table 282 may correspond to more than one prefix in the prefix tree. Thus, in one embodiment, the network device maintains a reference count for each prefix length so that a prefix length is not removed from the length table 282 prematurely. In another embodiment, prefix lengths are not removed from the length table. Although this embodiment does not cause any functional failures, keeping obsolete prefix lengths can decrease performance by causing hash table lookups for a non-existing prefix.

Use of the length table 282 and hash table 288 occurs upon receiving an IP packet. In step 316, a predetermined number of most significant bits of the destination IP address in the IP packet are compared with the indices of the length table 282 to obtain the list of possible prefix lengths. The key generator 284 constructs (step 320) a candidate key for a possible prefix length obtained from the length table 282, in one embodiment starting with the longest possible prefix length to the shortest length if the list includes more than one. The candidate key may have one or more fill bits.

In step 324, the hash value generator 286 hashes the candidate key to produce a hash value. The hash value is used to access (step 328) the hash bucket 288 in which to search for a data item that has a key value that matches the candidate key. The comparator/hash table 288 compares the candidate key with the key value of each data item in the appropriate hash bucket 288. Each comparison of a key value occurs as a single step that does not require masking.

When a data item with a matching key value is found (step 330), the routing information in the matching data item is used (step 332) to forward the IP packet.

If the comparator/hash table 288 does not find a match for the candidate key (step 330), and if there is another prefix length in the list retrieved from the length table 282 (step 336 and step 340), the process 300 continues at step 320 with the next prefix length. If there is no other prefix length (step 336), the network device uses a default route (step 344) to route the IP packet.

Pseudo-code for performing the process 300 is as follows:
Given "IP_Addr"=the IP address, '>>' is a logical right shift, and PLT[ ] represents the length table 282 having PLT_SIZE entries:

```
IP_route_found = FALSE
// obtain possible prefix lengths from length table
potential_lengths = PLT[IP_Addr >> (32-lg2(PLT_SIZE))]
```

-continued

```
while (potential_lengths! =0) && !IP_route_found
{   // MSB is an instruction that obtains the most significant bit
    // and thus extracts one prefix length at a time in one cycle
    prefix length = MSB (potential lengths)
    //generate Key
    Key.IP_addr = IP_Addr | (0xffffffff >> prefix_length)
    Key.prefix = prefix_length
    // search hash table
    IP_route_found = Table_lookup(Key, Data)
    potential_lengths & = ~(1 << prefix_length-1)
}
If !found
    Use default route
```

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of forwarding Internet Protocol (IP) packets, comprising:
producing at least one fixed-length key having a predetermined number of bits in response to an IP address in an IP packet;
hashing at least a portion of the fixed-length key to obtain a hash value; and
comparing the fixed-length key with a key value stored in each data item in a hash bucket associated with the hash value to find the data item that has the key value that matches the fixed-length key and to obtain from that data item routing information that is used to forward the IP packet.

2. The method of claim 1, wherein each comparison of the fixed-length key with a key value occurs as a single comparison without masking.

3. The method of claim 1, wherein the step of producing a fixed-length key includes appending at least one fill bit and at least one prefix length bit to a predetermined number of IP address bits.

4. The method of claim 3, wherein the at least one fill bit has a predetermined value.

5. The method of claim 1, wherein the hashed portion of the fixed-length key is the entire fixed-length key.

6. The method of claim 1, further comprising constructing a length table based on an IP address prefix tree.

7. The method of claim 6, further comprising defining a predetermined number of prefix bits of the IP address to be an index to the length table.

8. The method of claim 7, further comprising associating at least one prefix length with each index to the length table.

9. The method of claim 8, wherein the step of producing at least one fixed-length key produces a fixed-length key for each prefix length that is listed in the length table as being associated with the index defined by the prefix bits of the IP address.

10. An apparatus for forwarding IP packets, comprising:
a key generator producing a fixed-length key having a predetermined number of bits in response to an IP address;
a hash value generator hashing a portion of the fixed-length key to produce a hash value; and
a comparator comparing the fixed-length key with a key value stored in each data item in a hash bucket associated with the hash value to find the data item that has the key value that matches the fixed-length key and to obtain from that data item routing information that is used to forward the IP packet.

11. The apparatus of claim 10, wherein each comparison performed by the comparator occurs as a single comparison without masking.

12. The apparatus of claim 10, wherein at least one of the key generator, hash value generator, and comparator is implemented in hardware.

13. The apparatus of claim 10 wherein at least one of the key generator, hash value generator, and comparator is implemented in software.

14. The apparatus of claim 10, wherein the fixed-length key includes at least one IP address prefix bit, at least one length bit to indicate a number of prefix bits in the fixed-length key, and a sufficient number of fill bits such that the fixed-length key has the predetermined number of bits.

15. The apparatus of claim 14, wherein each fill bit has a predetermined bit value.

16. The apparatus of claim 10, wherein the portion of the fixed-length key that is hashed by the hash value generator is the entire fixed-length key.

17. The apparatus of claim 10, further comprising a length table constructed in response to an IP address prefix tree.

18. The apparatus of claim 17, wherein the length table includes a plurality of entries, each entry having an index value and at least one prefix length value.

19. The apparatus of claim 18 wherein a predetermined number of prefix bits of the IP address provide an index to the length table.

20. The apparatus of claim 19, wherein the key generator produces a fixed-length key for each prefix length value that is listed in the length table as being associated with the index defined by the prefix bits of the IP address.

* * * * *